United States Patent
Ebel et al.

(10) Patent No.: US 10,454,770 B2
(45) Date of Patent: Oct. 22, 2019

(54) SYSTEM, METHOD, AND COMPUTER PROGRAM PRODUCT FOR EXTRACTING A TOPOLOGY OF A TELECOMMUNICATIONS NETWORK RELATED TO A SERVICE

(71) Applicant: TEOCO LTD., Fairfax, VA (US)

(72) Inventors: Shachar Ebel, Mevaseret Zion (IL); Yoav Sapir, Rehovot (IL)

(73) Assignee: TEOCO LTD., Rosh Ha'ayin (IL)

( * ) Notice: Subject to any disclaimer, the term of this patent is extended or adjusted under 35 U.S.C. 154(b) by 246 days.

(21) Appl. No.: 14/696,353

(22) Filed: Apr. 24, 2015

(65) Prior Publication Data
US 2016/0315818 A1  Oct. 27, 2016

Related U.S. Application Data

(60) Provisional application No. 61/984,053, filed on Apr. 25, 2014.

(51) Int. Cl.
*H04L 12/24* (2006.01)
*H04L 29/08* (2006.01)
(Continued)

(52) U.S. Cl.
CPC .............. *H04L 41/12* (2013.01); *H04L 41/06* (2013.01); *H04L 41/5012* (2013.01);
(Continued)

(58) Field of Classification Search
CPC ..... H04L 41/06; H04L 41/0631; H04L 67/10; H04L 67/16; H04L 41/0677;
(Continued)

(56) References Cited

U.S. PATENT DOCUMENTS 5,761,502 A * 6/1998 Jacobs ................ H04L 41/0631
5,872,911 A * 2/1999 Berg ....................... H04L 43/00
379/111
(Continued)

OTHER PUBLICATIONS

Acharya et al., "Presence Based Network Topology Tracing System for VoIP Networks", 2011 IFIP/IEEE International Symposium on Integrated Network Management (IM), 2011, pp. 785-799.*
(Continued)

*Primary Examiner* — Vivek Srivastava
*Assistant Examiner* — William C McBeth
(74) *Attorney, Agent, or Firm* — ATFirm PLLC; Ralph P. Albrecht

(57) ABSTRACT

A computerized method, system, and computer program product thereof determines a service topology of a telecommunication network respective of one or more user devices. Information related to a service, provided to the user device over a telecommunication network, is received. The service may be providing connectivity required for a voice call, a data session, short message service (SMS) or the like. Information related to at least a network element of the telecommunication network is collected, the network element having supplied the service. A telecommunication network topology for the service is determined related to the information. A failure notification is received through the telecommunication network. An impact on the service is determined, related to the telecommunication network topology and the failure notification. The impact may be full or partial loss of service. A service notification may be sent related to the determined impact, for example to a fault management system.

36 Claims, 3 Drawing Sheets

(51) Int. Cl.
*H04M 15/00* (2006.01)
*H04M 3/22* (2006.01)

(52) U.S. Cl.
CPC .......... *H04L 67/16* (2013.01); *H04L 41/0631* (2013.01); *H04M 3/2218* (2013.01); *H04M 15/41* (2013.01)

(58) Field of Classification Search
CPC ..... H04L 41/0686; H04L 41/12; H04L 41/14; H04L 41/142; H04L 41/145; H04L 41/5012; H04W 4/02; H04W 4/12; H04W 4/14; H04W 68/00; H04M 3/2218; H04M 15/41
See application file for complete search history.

(56) References Cited

U.S. PATENT DOCUMENTS

| | | | |
|---|---|---|---|
| 5,963,943 A | 10/1999 | Cummins et al. | |
| 5,999,604 A * | 12/1999 | Walter | H04M 3/2218 379/112.01 |
| 6,442,615 B1 * | 8/2002 | Nordenstam | H04L 41/142 709/223 |
| 6,708,034 B1 | 3/2004 | Sen et al. | |
| 6,907,549 B2 * | 6/2005 | Davis | H04L 69/40 714/46 |
| 6,973,494 B2 * | 12/2005 | Weisser, Jr. | H04L 41/0233 707/999.104 |
| 7,509,518 B2 * | 3/2009 | Bailey | G06F 11/008 707/999.101 |
| 7,620,535 B2 * | 11/2009 | Shevenell | H04L 41/145 703/13 |
| 7,944,833 B2 | 5/2011 | Lee et al. | |
| 7,965,830 B2 | 6/2011 | Fleck et al. | |
| 7,995,470 B2 | 8/2011 | Cheng et al. | |
| 8,130,675 B2 * | 3/2012 | Raghavendran | H04L 41/12 370/254 |
| 8,320,261 B2 * | 11/2012 | Vasamsetti | H04L 41/12 370/242 |
| 2002/0022952 A1 * | 2/2002 | Zager | H04L 41/0631 703/22 |
| 2002/0147828 A1 | 10/2002 | Chen et al. | |
| 2003/0076936 A1 * | 4/2003 | Locke | H04M 3/2218 379/112.01 |
| 2003/0149919 A1 * | 8/2003 | Greenwald | G06F 11/2257 714/43 |
| 2004/0046785 A1 * | 3/2004 | Keller | G06F 9/5061 715/734 |
| 2006/0140369 A1 * | 6/2006 | Altmann | H04M 15/42 379/114.13 |
| 2007/0269036 A1 * | 11/2007 | Bates | H04M 15/41 379/212.01 |
| 2008/0263388 A1 * | 10/2008 | Allen | H04L 41/0631 714/4.1 |
| 2009/0157371 A1 * | 6/2009 | Conway | H04L 41/06 703/13 |
| 2009/0268605 A1 * | 10/2009 | Campbell | H04L 41/12 370/216 |
| 2010/0128600 A1 * | 5/2010 | Srinivasmurthy | H04L 41/12 370/221 |
| 2010/0153787 A1 * | 6/2010 | Beattie, Jr. | H04L 41/0681 714/43 |
| 2010/0208621 A1 | 8/2010 | Morper | |
| 2010/0290610 A1 * | 11/2010 | Gore | H04M 15/41 379/142.15 |
| 2011/0255422 A1 * | 10/2011 | Narasappa | H04L 12/4641 370/245 |
| 2011/0302292 A1 * | 12/2011 | Acharya | H04L 41/12 709/224 |
| 2012/0297061 A1 * | 11/2012 | Pedigo | H04L 43/12 709/224 |
| 2012/0303413 A1 * | 11/2012 | Wang | G06Q 10/0631 705/7.31 |
| 2013/0077480 A1 * | 3/2013 | George | H04L 41/145 370/225 |
| 2013/0121686 A1 | 5/2013 | Voigt et al. | |
| 2013/0227103 A1 * | 8/2013 | Garimella | H04L 41/5054 709/223 |
| 2013/0232382 A1 * | 9/2013 | Jain | H04L 41/069 714/48 |
| 2014/0092726 A1 | 4/2014 | Khan et al. | |
| 2015/0295774 A1 * | 10/2015 | Pugaczewski | H04L 41/12 370/254 |
| 2015/0304222 A1 * | 10/2015 | Ko | H04M 3/2218 370/241 |

OTHER PUBLICATIONS

Bellary et al., "Intelligent transport network survivability: study of distributed and centralized control techniques using DCS and ADMs," IEEE Global Telecommunications Conference, 1990, and Exhibition. 'Communications: Connecting the Future', vol. 2, Dec. 2-5, 1990, pp. 1264-1268.*

Falconer, "Service assurance in modern telecommunications networks," IEEE Communications Magazine, vol. 28, No. 6, Jun. 1990, pp. 32-39.*

Rowe, "A study of the path availability improvements in a large network for various route diversity protection strategies, using failure event simulation," Second IEE National Conference on Telecommunications, 1989, Apr. 2-5, 1989, pp. 167-172.*

"3GPP TS 32.298 V9.2.0—Charging Data Record (CDR) parameter description (Release 9)", 3rd Generation Partnership Project, Dec. 2009 (Year: 2009).*

W. Guo, A. Dunstan and J. Finkelstein, "Using IPDR to transfer network management and measurement information," 2011 IEEE International Workshop Technical Committee on Communications Quality and Reliability (CQR), Naples, FL, 2011, pp. 1-6. (Year: 2011).*

* cited by examiner

SYSTEM, METHOD, AND COMPUTER PROGRAM PRODUCT FOR EXTRACTING A TOPOLOGY OF A TELECOMMUNICATIONS NETWORK RELATED TO A SERVICE

CROSS REFERENCE TO RELATED APPLICATIONS

The present disclosure is a US NonProvisional patent application, which claims the benefit under 35 U.S.C. Section 119(e) of U.S. Provisional Patent Application No. 61/984,053, Conf. No. 8085, filed Apr. 25, 2014, entitled, "A System and Method for Extracting a Topology of a Telecommunications Network Respective of a Service," the contents of which is incorporated herein by reference in its entirety.

BACKGROUND

Technical Field of the Disclosure

The disclosure generally relates to determining a network service topology within a telecommunication network and particularly to service impact within a determined network service topology related to one or more user devices.

Related Art

Telecommunication networks include a large variety of elements which together form the network. These may be physical elements such as switches, logical elements such as monitoring software or combinations of physical and logical elements. As these networks become larger, they are increasingly difficult for providers to monitor and service. For example, a first cell tower may serve five hundred users, while a second cell tower may serve only one hundred. However, the users of the second cell tower may be the source of ninety percent of the income for the provider, making the second cell tower more financially valuable to the provider. In another example, a provider wishing to disconnect an element from the network (to upgrade or replace the element) may find it advantageous to determine what impact the disconnection of the element has on the service provided to one or more users.

SUMMARY

The disclosure sets forth systems, methods and computer program products relating to a computerized method for determining a service topology of a telecommunication network related to at least a user device, the method can include: receiving, by a server communicatively coupled to the telecommunication network information related to at least a service provided over the telecommunication network to the at least a user device; detecting from the information at least a network element (NE) of the telecommunication network, the NE having supplied the at least a service; and determining by the server, related to the detection, a telecommunication network service topology of the at least a user device, the topology can include: the at least a user device, and the at least a NE.

In one embodiment, the computerized method can include where the telecommunication network service topology is further determined related to at least another user device.

In one embodiment, the computerized method can include where the telecommunication network service topology can include: a first NE providing the at least a service to the at least a user device, and a second NE providing the at least a service to the at least another user device.

In one embodiment, the computerized method can include where the at least a service can include one of: voice call, data, multimedia service (MMS), or short message service (SMS).

In one embodiment, the computerized method can further include where determining a secondary data service, delivered over the at least a service.

In one embodiment, the computerized method can include where the secondary data service can include: a multi-layer data service.

In one embodiment, the computerized method can include where the secondary data service can include at least one of: instant messaging (IM), voice over internet protocol (VoIP), Web browsing, Social network activity, audio content, video content, gaming content, application-specific content, or email.

In one embodiment, the computerized method can include where the telecommunication network service topology is determined related to a plurality of user devices.

In one embodiment, the computerized method can include where the telecommunication network service topology is determined related to a plurality of services.

In one embodiment, the computerized method can further include receiving through the telecommunication network at least a failure notification; determining, related to the telecommunication network service topology and the at least a failure notification, an impact on the at least a service.

In one embodiment, the computerized method can further include sending a service notification related to the determined impact.

In one embodiment, the computerized method can include where the determined impact can include at least one of: a full loss of a service, a partial loss of a service, a full loss of a service to a plurality of users, or a partial loss of a service to a plurality of users.

In one embodiment, the computerized method can include where the at least a failure notification can include a simulated notification.

In one embodiment, the computerized method can further include performing the method related to a plurality of user devices; and determining a shared telecommunication network service topology for the plurality of user devices.

In one embodiment, the computerized method can include where the shared telecommunication network service topology can include: network elements providing the at least a service to a portion of the plurality of user devices.

In another exemplary embodiment, the system for determining a service topology of a telecommunication network related to at least a user device, can include at least one processing unit; a network interface communicatively coupled to the at least one processing unit; and a memory communicatively coupled to the at least one processing unit, the memory containing instructions that when executed by the at least one processing unit configure the system to: receive through the telecommunication network information respective of at least a service provided over the telecommunication network to the at least a user device; detect from the information at least a network element (NE) of the telecommunication network, the NE having supplied the at least a service; and determine related to the detection a telecommunication network service topology of the at least a user device, the topology can include the at least a user device and the at least a NE.

In one embodiment, the system can include where the telecommunication network service topology is further determined related to at least another user device.

In one embodiment, the system can include where the telecommunication network service topology can include a first NE providing the at least a service to the at least a user device, and a second NE providing the at least a service to the at least another user device.

In one embodiment, the system can include where the at least a service can include one of: voice call, data, multimedia service (MMS), or short message service (SMS).

In one embodiment, the system can include where the memory further can include instructions that when executed by the processing unit cause the system to: determine a secondary data service delivered over the at least a service.

In one embodiment, the system can include where the secondary data service can include a multi-layer data service.

In one embodiment, the system can include where the secondary data service can include one of: instant messaging (IM), voice over internet protocol (VoIP), Web browsing, Social network activity, audio content, video content, gaming content, application-specific content, or email.

In one embodiment, the system can include where the telecommunication network service topology is determined related to a plurality of user devices.

In one embodiment, the system can include where the telecommunication network service topology is determined related to a plurality of services.

In one embodiment, the system can include where the memory can further include instructions that when executed by the at least one processing unit configure the system to: receive through the telecommunication network at least a failure notification; and determine, related to the telecommunication network service topology and the at least a failure notification, an impact on the at least a service.

In one embodiment, the system can include where the memory can further include instructions that when executed by the at least one processing unit configure the system to: send a service notification related to the determined impact.

In one embodiment, the system can include where the impact can include one of: a full loss of a service, a partial loss of a service, a full loss of a service to a plurality of users, or a partial loss of a service to a plurality of users.

In one embodiment, the system can include where the at least a failure notification can include a simulated notification.

In one embodiment, the system can include where the memory further can include instructions that when executed by the at least one processing unit configure the system to: perform the method related to a plurality of user devices; and determine a shared telecommunication network topology for the plurality of user devices.

In one embodiment, the system can include where the shared telecommunication network topology can include network elements providing the at least a service to a portion of the plurality of user devices.

In yet another exemplary embodiment, a non-transitory computer program product (CPP) embodied on a computer accessible medium, the CPP can include instructions, which when executed by at least one processor, performs a method of determining a service topology of a telecommunication network related to at least a user device, the method can include:

In one embodiment, the computer program product can include where receiving, by a server communicatively coupled to the telecommunication network information related to at least a service provided over the telecommunication network to the at least a user device; detecting from the information at least a network element (NE) of the telecommunication network, the NE having supplied the at least a service; and determining by the server, related to the detection, a telecommunication network service topology of the at least a user device, the topology can include the at least a user device and the at least a NE.

In one embodiment, the computer program product can include where the telecommunication network service topology is further determined related to at least another user device.

In one embodiment, the computer program product can include where the telecommunication network service topology can include a first NE providing the at least a service to the at least a user device, and a second NE providing the at least a service to the at least another user device.

In one embodiment, the computer program product can include where the at least a service can include one of: voice call, data, multimedia service (MMS) or short message service (SMS).

In one embodiment, the computer program product can include determining a secondary data service, delivered over the at least a service.

In one embodiment, the computer program product can include where the secondary data service can include a multi-layer data service.

In one embodiment, the computer program product can include where the secondary data service can include one of: instant messaging (IM), voice over internet protocol (VoIP), Web browsing, Social network activity, audio content, video content, gaming content, application-specific content, or email.

In one embodiment, the computer program product can include where the telecommunication network service topology is determined related to a plurality of user devices.

In one embodiment, the computer program product can include where the telecommunication network service topology is determined related to a plurality of services.

In one embodiment, the computer program product can include receiving through the telecommunication network at least a failure notification; determining, related to the telecommunication network service topology and the at least a failure notification, an impact on the at least a service.

In one embodiment, the computer program product can further include sending a service notification related to the determined impact.

In one embodiment, the computer program product can include where the impact is one of: a full loss of a service, a partial loss of a service, a full loss of a service to a plurality of users, or a partial loss of a service to a plurality of users.

In one embodiment, the computer program product can include where the at least a failure notification is a simulated notification.

In one embodiment, the computer program product can include where performing the method related to a plurality of user devices; and determining a shared telecommunication network service topology for the plurality of user devices.

In one embodiment, the computer program product can include where the shared telecommunication network service topology can include network elements providing the at least a service to a portion of the plurality of user devices.

BRIEF DESCRIPTION OF THE DRAWINGS

The accompanying drawings, which are included to provide a further understanding and are incorporated in and constitute a part of this specification, illustrate exemplary, and nonlimiting embodiments and together with the description serve to explain the principles disclosed herein. In the drawings, like reference numbers may indicate substantially similar, equivalent, or exemplary elements, and the left most digits in the corresponding reference number indicate the drawing in which an element first appears.

The subject matter disclosed herein is particularly pointed out and distinctly claimed in the claims at the conclusion of the specification. The foregoing and other objects, features and advantages will be apparent from the following detailed description taken in conjunction with the accompanying drawings, of which:

DETAILED DESCRIPTION OF VARIOUS EXEMPLARY EMBODIMENTS

Figure 1:
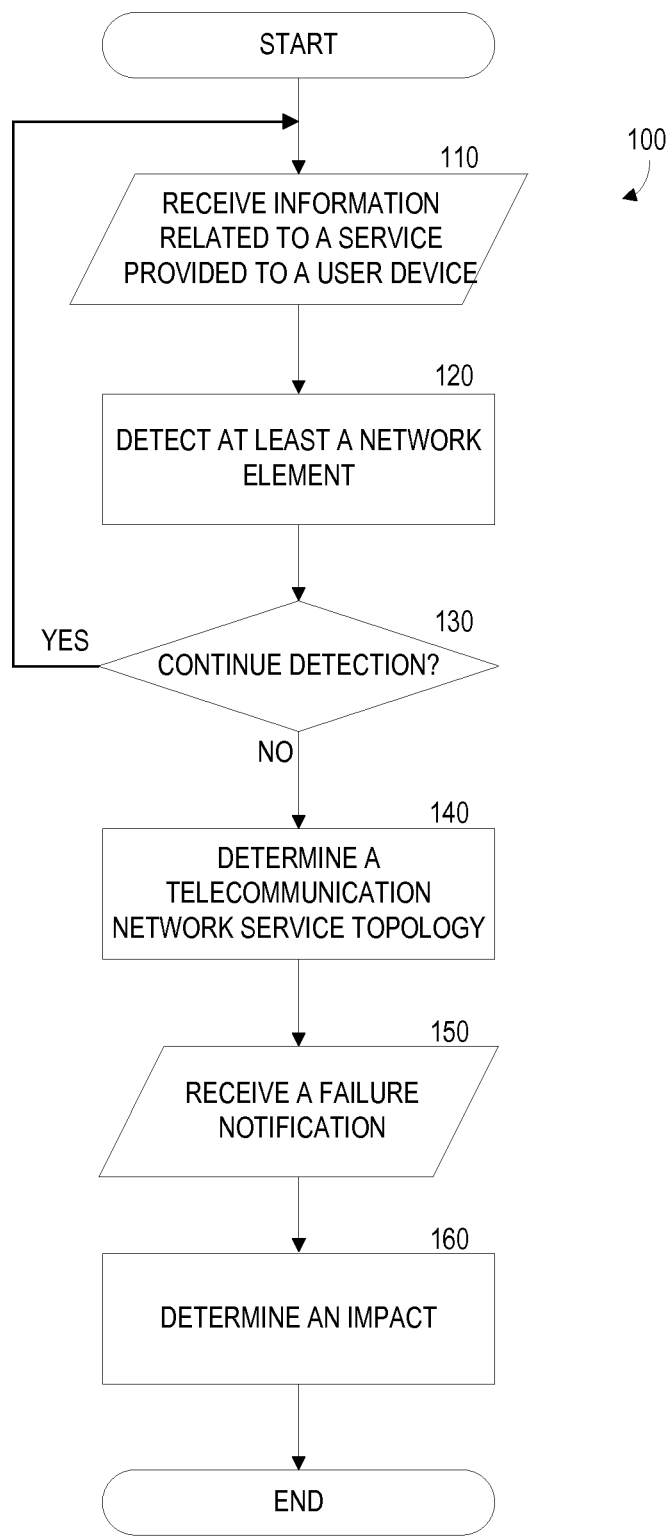
FIG. 1—is a flowchart of a computerized method for determining a service topology of a telecommunication network respective of a service according to an embodiment.

It is important to note that the embodiments disclosed are only examples of the many advantageous uses of the innovative teachings herein. In general, statements made in the specification of the present application do not necessarily limit any of the various claims. Moreover, some statements may apply to some exemplary features but not to others. In general, unless otherwise indicated, singular elements may be in plural and vice versa with no loss of generality. In the drawings, like numerals refer to like parts through several views.

A computerized method and system thereof, in an exemplary embodiment, can determine a service topology of a telecommunication network related to one or more user devices. Information related to a service, provided to the user device over a telecommunication network, can be received. The service may be providing connectivity required for a voice call, a data session, short message service (SMS) and the like. Information related to at least a network element of the telecommunication network can be collected, the network element having supplied the service. A telecommunication network topology for the service is determined related to the information. A failure notification is received through the telecommunication network. An impact on the service is determined, related to the telecommunication network topology and the failure notification. The impact may be full or partial loss of service. A service notification may be sent related to the determined impact, for example to a fault management system.

FIG. 1 is a non-limiting exemplary flowchart 100 of a computerized method for determining a service topology of a telecommunication network according to an embodiment. A telecommunication network service topology may include physical and logical elements of the network, each network element operative for providing at least a service to one or more user devices. In 110 information related to at least a service provided over a telecommunication network is received through the telecommunication network. The service may be provided to a user device. The service may be providing connectivity required for a voice call, a data session, multimedia message service (MMS), or short message service (SMS). A data session may include browsing the World Wide Web, sending and receiving instant messages (IMs), initiating and responding to voice over internet protocol (VoIP) sessions, sending and receiving: emails, audio content, video content, gaming content, application-specific content, and the like. In a data session, the data may be probed to determine a secondary data service, delivered over the data session service. The information may be a data record (xDR), such as a call data record (CDR) or internet protocol data record (IPDR). A CDR may include a first caller identification (ID), a second caller ID, call duration, an international mobile subscriber identity (IMSI) corresponding to the first caller, an IMSI corresponding to the second caller, an international mobile equipment identity (IMEI) corresponding to the first caller, an IMEI corresponding to the second caller, a network element identification (NE ID) and the like. In 120 at least a network element of the telecommunication network is detected. The network element supplies the at least a service, for example to a user device. The network element may also partially supply the at least a service. In 130 a check is performed to determine if additional network elements should be detected. If not, execution continues at 140, otherwise execution continues at 110. In 140 a telecommunication network service topology is determined related to the detected at least a network element and user device. In certain embodiments, the telecommunication network topology is determined related to a plurality of user devices. In some embodiments, the telecommunication network service topology includes a first network element providing a service to a first user device, and a second network element providing the service to a second user device. In 150 at least a failure notification is received through the telecommunication network. The at least a failure notification may be a simulated notification. In 160, an impact on the at least a service provided is determined, respective of the telecommunication network service topology and the at least a failure notification. The impact may be a full or partial loss of a service or plurality of services. The impact may affect a plurality of user devices, or a portion of the plurality of user devices. A service notification may be sent respective of the determined impact, for example to a fault management system.

Figure 2:
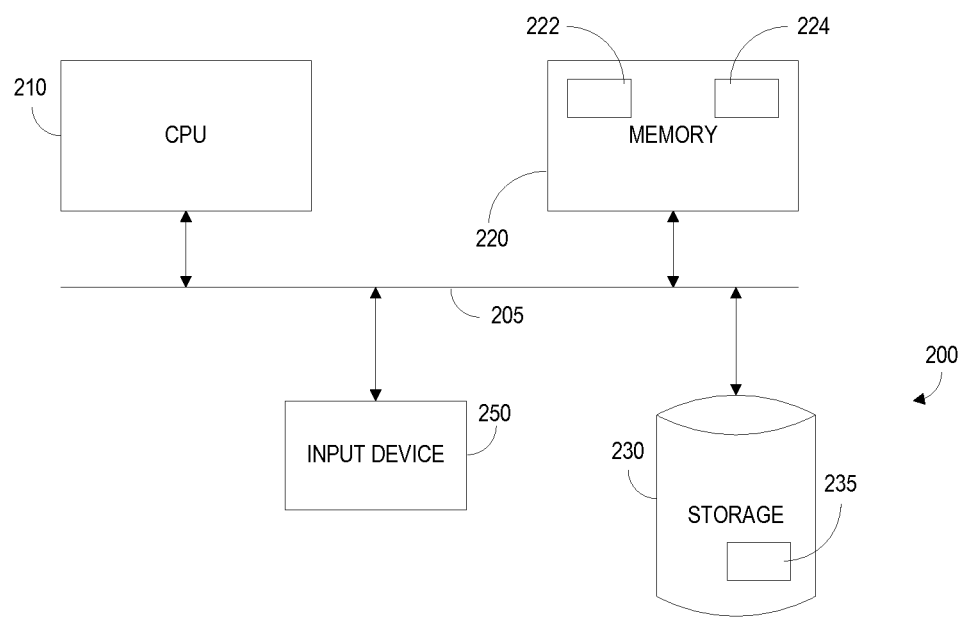
FIG. 2—is a schematic illustration of a service topology detection system implemented according to an embodiment.

FIG. 2 is an exemplary and non-limiting schematic illustration of a topology detection system 200 implemented according to an embodiment. The system 200 comprises at least a processing element 210, for example, a central processing unit (CPU). The CPU is coupled via a bus 205 to a memory 220. The memory 220 includes a memory portion 222 that contains instructions that when executed by the processing element 210 performs the method described in more detail herein. The memory may be further used as a working scratch pad for the processing element 210, a temporary storage, and others, as the case may be. The memory may comprise of volatile memory such as, but not limited to random access memory (RAM), or non-volatile memory (NVM), such as, but not limited to, Flash memory. Memory 220 may further include memory portion 224 containing information respective of at least a service provided to a user device. The processing element 210 may be coupled to an input 250. The processing element 210 may be further coupled with a database 230. Database 230 may be used for the purpose of holding a copy of the method executed in accordance with the disclosed technique. Database 230 may further comprise storage portion 235 containing a telecommunication network service topology respective of one or more user devices. In an embodiment, the topology detection system 200 is configured to execute the methods described herein with respect of FIG. 1. This method may be hardwired or, presented as a series of instructions to be executed by the processing element 210.

Figure 3:
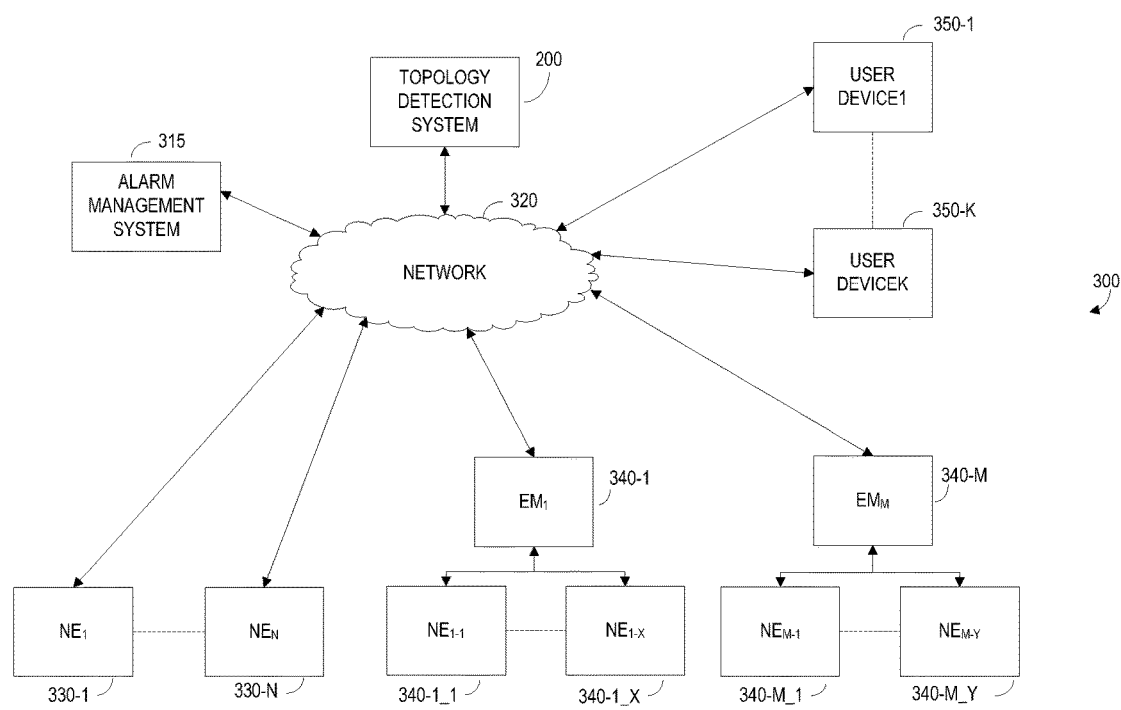
FIG. 3—is a schematic illustration of a service topology detection system implemented within a telecommunication network in accordance with an embodiment.

FIG. 3 is an exemplary and non-limiting schematic illustration of a topology detection system 200 implemented within a telecommunication network 300 in accordance with an embodiment. The system 200 is communicatively coupled with Network Elements (NEs) and Element Managers (EMs) through network 320. The network 320 is configured to provide connectivity of various sorts, as may be necessary, including but not limited to, wired and/or wireless connectivity, including, for example, local area network (LAN), wide area network (WAN), metro area network (MAN), World Wide Web (WWW), Internet, and any combination thereof, as well as cellular connectivity. Network 320 is further communicatively coupled with $NE_1$ 330-1 through $NE_N$ 330-N, generally referenced NEs 330 and $EM_1$ 340-1 through $EM_M$ 340-M, generally referenced EMs 340. EMs 340 each manage a plurality of NEs, such that $EM_1$ 340-1 manages $NE_{1-1}$ 340-1_1 through $NE_{1-X}$ 340-1_X and $EM_M$ 340-M manages $NE_{M-1}$ 340-M_1 through $NE_{M-Y}$ 340-M_Y. Network 320 provides telecommunication services to user devices, such as user devices 350-1 to 350-K, generally referenced user device 350. For example, the topology detection system may detect that NE 340-1_2 and NE 340-1_X provide services to user device 350-1. Therefore, the telecommunication network topology respective of user device 350-1 includes NE 340-1_2, NE 340-1_X and EM 340-1. In a further example, a telecommunication network topology is determined for another user device 350-2. The telecommunication network topology for another user device 350-2 includes NE 340-1_2, NE 340-M_1, EM 340-1 and EM 340-M. A shared network topology respective of user device 350-1 and another user device 350-2 may include elements shared by both topologies, or all elements of both topologies. The system 200 is configured to execute methods described herein with respect of FIG. 1. It should be noted that 'N', 'M', 'K', 'Y' and 'X', are integers having a value of '1' or greater.

The principles of the disclosure are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for determining a telecommunication network service topology of a telecommunication network related to at least a user device via an automated topology detection system, the method comprising:
   receiving, by at least one electronic processor of an electronic server communicatively coupled to the telecommunication network, a data record of a service provided over the telecommunication network to at least one user device, the data record comprising one of a call data record (CDR) and an internet protocol data record (IPDR), the data record including a network element identifier and an identifier of the at least one user device;
   detecting, by the at least one electronic processor from the data record, a network element of the telecommunication network associated with the network element identifier, the network element having supplied the service to the at least one user device;
   determining, by the at least one electronic processor, a secondary data service delivered over the service;
   determining, by the at least one electronic processor based on the detection, a telecommunication network service topology based on the at least one user device, the telecommunication network service topology comprising:
      the at least one user device; and
      the network element, wherein the network element is any of a physical element of the telecommunication network, a logical element of the telecommunication network, or a combination thereof;
   receiving, by the at least one electronic processor through the telecommunication network, at least one failure notification; and
   determining, by the at least one electronic processor based on the telecommunication network service topology and the at least one failure notification, a determined impact on the service and the secondary data service;
   wherein the at least one failure notification comprises a simulated notification.

2. The computerized method of claim 1, wherein the telecommunication network service topology is further determined related to at least another user device.

3. The computerized method of claim 2, wherein the telecommunication network service topology comprises:
   a first network element providing the service to the at least one user device; and
   a second network element providing the service to the at least another user device.

4. The computerized method of claim 1, wherein the service comprises at least one of voice call, data, multimedia service (MMS), or short message service (SMS).

5. The computerized method of claim 1, wherein the secondary data service comprises a multi-layer data service.

6. The computerized method of claim 1, wherein the secondary data service comprises at least one of instant messaging (IM), voice over internet protocol (VoIP), web browsing, social network activity, audio content, video content, gaming content, application-specific content, or email.

7. The computerized method of claim 1, wherein the telecommunication network service topology is determined related to a plurality of user devices.

8. The computerized method of claim 1, wherein the telecommunication network service topology is determined related to a plurality of services.

9. The computerized method of claim 1, further comprising:
sending a service notification related to the determined impact on the service and the secondary data service.

10. The computerized method of claim 1, wherein the determined impact comprises at least one of a full loss of the service and the secondary data service, a partial loss of the service and the secondary data service, a full loss of the service and the secondary data service to a plurality of users, or a partial loss of the service and the secondary data service to a plurality of users.

11. The computerized method of claim 1, further comprising:
performing the method of claim 1 related to a plurality of user devices; and
determining a shared telecommunication network service topology for the plurality of user devices.

12. The computerized method of claim 11, wherein the shared telecommunication network service topology comprises:
at least one of a plurality of network elements providing the service to a portion of the plurality of user devices.

13. An automated topology detection system for determining a telecommunication network service topology of a telecommunication network related to at least a user device, the system comprising:
at least one processing unit;
a network interface communicatively coupled to the at least one processing unit; and
a memory communicatively coupled to the at least one processing unit, the memory containing instructions that, when executed by the at least one processing unit, configure the system to:
receive, through the telecommunication network, a data record of a service provided over telecommunication network to at least one user device, the data record comprising one of a call data record (CDR) and an internet protocol data record (IPDR), the data record including a network element identifier and an identifier of the at least one user device;
detect, from the data record, a network element of the telecommunication network associated with the network element identifier, the network element having supplied the service to the at least one user device;
determine a secondary data service delivered over the service; and
determine, based on the detection, a telecommunication network service topology based on the at least one user device, the telecommunication network service topology comprising:
the at least one user device; and
the network element, wherein the network element is any of a physical element of the telecommunication network, a logical element of the telecommunication network, or a combination thereof;
receive, through the telecommunication network, at least one failure notification; and
determine, based on the telecommunication network service topology and the at least one failure notification, a determined impact on the service and the secondary data service;
wherein the at least one failure notification comprises a simulated notification.

14. The system of claim 13, wherein the telecommunication network service topology is further determined related to at least another user device.

15. The system of claim 14, wherein the telecommunication network service topology comprises:
a first network element providing the service to the at least one user device; and
a second network element providing the service to the at least another user device.

16. The system of claim 13, wherein the service comprises at least one of voice call, data, multimedia service (MMS), or short message service (SMS).

17. The system of claim 13, wherein the secondary data service comprises a multi-layer data service.

18. The system of claim 13, wherein the secondary data service comprises at least one of instant messaging (IM), voice over internet protocol (VoIP), web browsing, social network activity, audio content, video content, gaming content, application-specific content, or email.

19. The system of claim 13, wherein the telecommunication network service topology is determined related to a plurality of user devices.

20. The system of claim 13, wherein the telecommunication network service topology is determined related to a plurality of services.

21. The system of claim 13, wherein the memory further comprises instructions that, when executed by the at least one processing unit, configure the system to:
send a service notification related to the determined impact on the service and the secondary data service.

22. The system of claim 13, wherein the determined impact comprises at least one of a full loss of the service and the secondary data service, a partial loss of the service and the secondary data service, a full loss of the service and the secondary data service to a plurality of users, or a partial loss of the service and the secondary data service to a plurality of users.

23. The system of claim 13, wherein the memory further comprises instructions that, when executed by the at least one processing unit, configure the system to:
perform the process of claim 13 related to a plurality of user devices; and
determine a shared telecommunication network topology for the plurality of user devices.

24. The system of claim 23, wherein the shared telecommunication network topology comprises at least one of a plurality of network elements that provide the service to a portion of the plurality of user devices.

25. A non-transitory computer program product embodied on a non-transitory computer accessible medium comprising instructions that, when executed by at least one processor of a computing device communicatively coupled to a telecommunication network, configure the computing device to perform steps for determining a telecommunication network service topology of the telecommunication network related to at least a user device, the steps comprising:
receiving, by the computing device, a data record of a service provided over the telecommunication network to at least one user device, the data record comprising one of a call data record (CDR) and an internet protocol data record (IPDR), the data record including a network element identifier and an identifier of the at least one user device;
detecting, by the computing device from the data record a network element of the telecommunication network associated with the network element identifier, the network element having supplied the service to the at least one user device;
determining, by the computing device, a secondary data service delivered over the service;

determining, by the computing device based on the detection, a telecommunication network service topology based on the at least one user device, the telecommunication network service topology comprising:
- the at least one user device; and
- the network element, wherein the network element is any of a physical element of the telecommunication network, a logical element of the telecommunication network, or a combination thereof;

receiving, by the computing device through the telecommunication network, at least one failure notification; and determining, by the computing device based on the telecommunication network service topology and the at least one failure notification, a determined impact on the service and the secondary data service;

wherein the at least one failure notification comprises a simulated notification.

26. The non-transitory computer program product of claim 25, wherein the telecommunication network service topology is further determined related to at least another user device.

27. The non-transitory computer program product of claim 26, wherein the telecommunication network service topology comprises:
- a first network element providing the service to the at least one user device; and
- a second network element providing the service to the at least another user device.

28. The non-transitory computer program product of claim 25, wherein the service comprises at least one of voice call, data, multimedia service (MMS) or short message service (SMS).

29. The non-transitory computer program product of claim 25, wherein the secondary data service comprises a multi-layer data service.

30. The non-transitory computer program product of claim 25, wherein the secondary data service comprises at least one of instant messaging (IM), voice over internet protocol (VoIP), web browsing, social network activity, audio content, video content, gaming content, application-specific content, or email.

31. The non-transitory computer program product of claim 25, wherein the telecommunication network service topology is determined related to a plurality of user devices.

32. The non-transitory computer program product of claim 25, wherein the telecommunication network service topology is determined related to a plurality of services.

33. The non-transitory computer program product of claim 25, wherein the steps further comprise:
sending a service notification related to the determined impact on the service and the secondary data service.

34. The non-transitory computer program product of claim 25, wherein the determined impact comprises at least one of a full loss of the service and the secondary data service, a partial loss of the service and the secondary data service, a full loss of the service and the secondary data service to a plurality of users, or a partial loss of the service and the secondary data service to a plurality of users.

35. The non-transitory computer program product of claim 25, wherein the steps further comprise:
- performing the steps of claim 25 related to a plurality of user devices; and
- determining a shared telecommunication network service topology for the plurality of user devices.

36. The non-transitory computer program product of claim 35, wherein the shared telecommunication network service topology comprises at least one of a plurality of network elements providing the service to a portion of the plurality of user devices.

* * * * *